Nov. 3, 1953   F. P. FABEL   2,657,936
SERVICING CART FOR BABY CHICK BATTERIES
Filed March 14, 1951
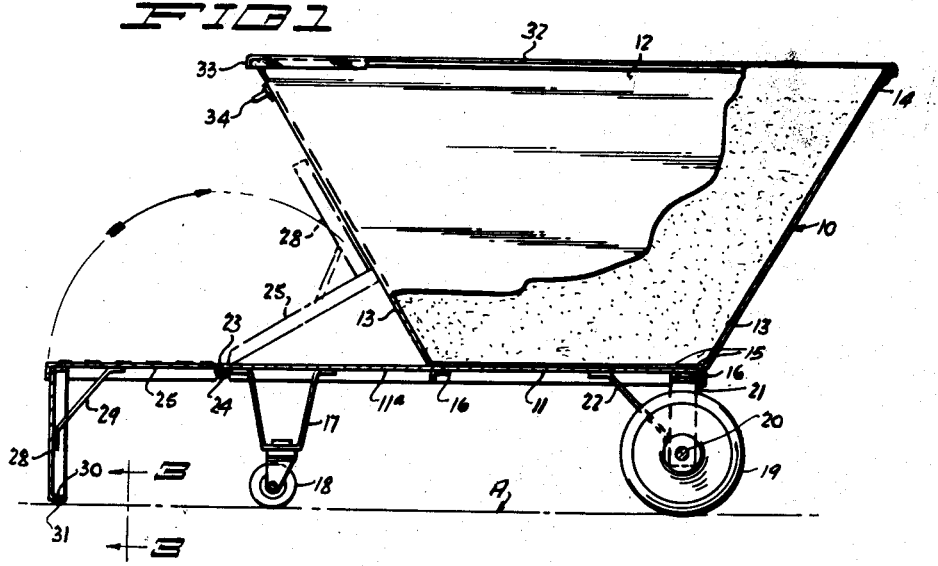
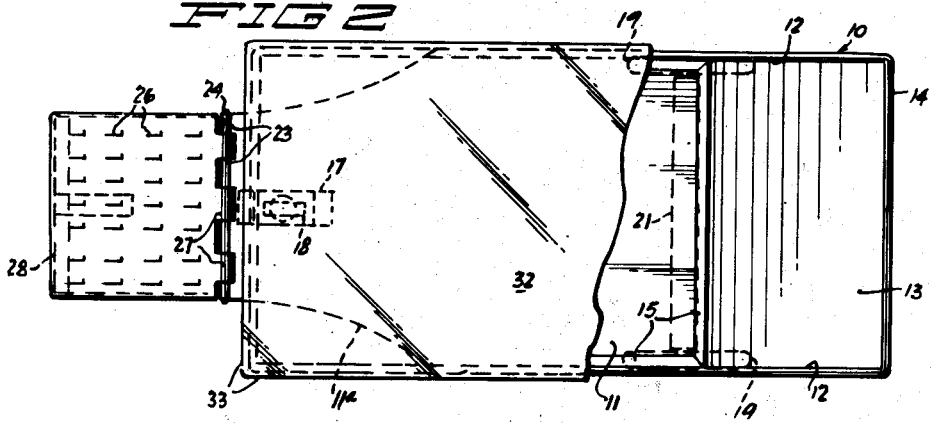
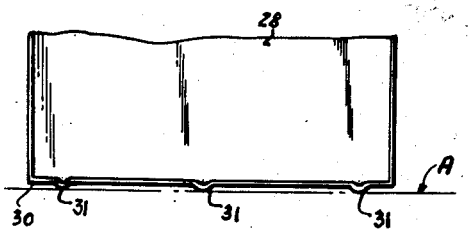
INVENTOR
FRED P. FABEL
BY *Carlsen + Hazle*
ATTORNEYS.

Patented Nov. 3, 1953

2,657,936

UNITED STATES PATENT OFFICE 2,657,936

SERVICING CART FOR BABY CHICK BATTERIES

Fred P. Fabel, Buffalo Lake, Minn.

Application March 14, 1951, Serial No. 215,555

2 Claims. (Cl. 280—34)

This invention relates to a cart used in servicing the batteries wherein baby chicks are kept during the earlier stages of their life. In the usual hatchery or baby chick supply establishment these batteries, which take the form of flat cages with a feed trough along one side, are arranged in tiers, one above the other, and in quite closely spaced rows in order to make best advantage of the floor space. Since the lowermost battery must be placed a considerable distance above the floor to avoid cold air drafts, it necessarily follows that the uppermost batteries are quite difficult to service by a person of average height. In supplying these batteries with feed and also in removing the bottom trays for cleaning the batteries, it has been the custom to use a stool or any other support which may be about the place in order to reach the upper batteries, but as the primary object of my invention I provide a cart in which the feed is stored, and which itself has a step upon which the operator may stand while servicing the upper batteries.

Another object of my invention is to provide a service cart for this purpose which is of such shape and size as to pass readily between the rows of battery tiers, and with the step foldably arranged so that it may be swung up out of the way when not in use. When unfolded for use, the step has a stand portion which engages the floor so that the operator's weight will hold the cart against travel movements such as might unbalance the operator, but further, in accordance with my invention, this stand is provided with anti-friction floor engaging means so that, when the operator is off the step, the cart may be moved along between the battery tiers without the necessity of folding the stand up out of the way each time the cart is moved to another position.

Another object of my invention is to provide a servicing cart for this purpose with a removable top for the feed container which will serve as a work table whereupon the bottom trays of the batteries may be placed while they are cleaned. During this operation the step above referred to, in conjunction with an extension of the cart to which the step is pivoted, serves as a support for the papers with which the bottom trays are covered following the cleaning process.

These and other more detailed and specific objects will be disclosed in the course of the following specification, reference being had to the accompanying drawings, in which—

Fig. 1 is a side elevation of a cart according to my invention with one end and a lower portion shown in vertical section, and showing the step in its folded position in broken lines.

Fig. 2 is a plan view of the cart with a portion of the work table top broken away at one end.

Fig. 3 is a fragmentary inside elevation of the stand portion of the cart as viewed along the lines 3—3 in Fig. 1, and showing the anti-friction bosses which ride the floor surface.

I have shown my improved battery servicing cart herein as fabricated from sheet metal although it may, of course, be made up from wood or other suitable material. In any case, the cart comprises a feed container designated generally at 10 having a closed bottom 11, parallel vertical sides 12 and upwardly flaring ends 13. This container is narrow and elongated so that it will pass readily between the rows of battery tiers, and preferably is of a size such as to contain somewhat over one hundred pounds of chick feed. Any conventional fabrication methods may be used for assembling the various sheet metal components of the cart, and, as here shown, the upper edges of the container are rolled at 14, while the lower edges of the upright portions of the container are flanged at 15 for weldment to the bottom 11. This bottom is also conventionally stiffened by means of angles 16 welded in place at strategic intervals.

At one end the bottom 11 has an extension 11a to the underside of which is secured a depending bracket 17 carrying a caster wheel 18 for supporting this end of the cart. Support for the opposite end of the cart is provided by spaced rubber tired wheels 19 carried at the ends of an axle 20 in a bracket 21 depending from the bottom 11, slidably stiffened by a brace bar 22. It will be noted in Fig. 2 that these wheels 19 are located inwardly with respect to the sides of the feed container so as to present no obstruction to the travel of the cart between the battery tiers. The aforesaid extension 11a is reduced in width toward its extremity, and at this extremity is provided with spaced hinge eyes 23 through which extends a hinge pin 24 crosswise with respect to the direction of travel of the cart. A sheet metal step 25 of rectangular shape, and having conventional non-skid projections 26, is formed along one edge with mating hinge eyes 27 to fit between the eyes 23 and accommodate the pin 24, whereby this step may be swung from a folded position, illustrated in broken lines in Fig. 1, wherein it rests against the adjacent end of the feed container 10, outward and downward to an unfolded position at which the step forms a horizontal projection of the bottom of the cart. In the latter position the step 25 is spaced outwardly from the adjacent end of the feed container so that an operator may stand on the step without interference from said container. To support the weight of the operator the step is then provided with a formed up sheet metal stand 28 welded in place and stiffened by a diagonal brace 29 welded to the stand and to the underside of the step. This stand 28 has a lower flange 30 from which anti-friction bosses 31 are downwardly punched in spaced locations, and these bosses rest upon the floor surface designated at A.

The cart is completed by the provision of a rectangular sheet metal top 32 of a shape and size such as to fit over the open upper end of the container 10 and serve as a work table when feed is not being removed from the container. This top 32 is provided with depending flanges 33 to overlie the upper edges of the feed container and hold the top in place, and a handle 34 is affixed to one end of the cart so that it may be pushed or pulled along at will.

It is thought that the use of the cart will be obvious to those skilled in the art, and it will enable the operator to service baby chick batteries with an ease not provided by any equipment presently on the market. While the chicks are being fed the table top 32 is, of course, set aside and the cart is moved down between the battery tiers with the step 25 unfolded so that the operator may, at any time, mount this step in order to reach the upper batteries with ease. While the operator is standing upon the step 25 his weight will prevent the cart from moving, but the anti-friction bosses 31 will allow the cart to move freely in either direction when the operator dismounts, making it unnecessary to fold and unfold the step each time the cart is moved to a new position. When the batteries are being cleaned, the top 32 is placed upon the feed container, and it then serves as a convenient work table upon which the bottom trays of the batteries may be placed, while the overall length of the bottom extension 11ª and the step 25 is such as to provide a platform upon which may be stacked the papers with which the bottom trays are covered following the cleaning operation. Thus the cart provides the maximum of convenience for all of the necessary operations of servicing baby chick batteries and does away with the necessity for separate feed bins, stools and the like, all of which are now used in such work.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a cart of the character described for servicing baby chick batteries as conventionally arranged in tiers and with the tiers in closely spaced rows, a feed container having a closed bottom and open top and of such width as to pass freely between the rows of battery tiers, the bottom having an extension at one end, a caster wheel beneath the extremity of said extension and wheels beneath the opposite end of the container, a step pivotally mounted at the extremity of said extension and foldable from a position against the adjacent end of the container out to an unfolded position forming a horizontal projection of said extension, and a stand on said step to engage the floor and support the weight of an operator as he stands on the step in servicing the upper batteries, the lower edge of the stand having anti-friction means engaging the floor whereby the cart may be moved in either direction with the step in its unfolded position.

2. A cart of the character described for servicing baby chick batteries, comprising a feed container having sides, ends and a bottom, transversely spaced wheels supportably connected to one end of the cart and the bottom having an endwise extension at the other end, a hinge along the extremity of the extension, a caster mounted wheel centrally located beneath the said extension adjacent the hinge, and a step connected to said hinge for movements thereon from a lowered position forming a further extension of the bottom to an upper folded position resting out of the way against the adjacent end of the container, the said step being narrower than the container itself and having a central depending stand for engaging the floor.

FRED P. FABEL.

References Cited in the file of this patent

UNITED STATES PATENTS

| Number | Name | Date |
|---|---|---|
| 428,790 | Wagenen et al. | May 27, 1890 |
| 569,520 | Russell | Oct. 13, 1896 |
| 607,329 | Beebe | July 12, 1898 |
| 1,200,008 | Myers et al. | Oct. 3, 1916 |
| 1,543,626 | Stansbury | June 23, 1925 |
| 1,649,065 | Jarvis et al. | Nov. 15, 1927 |
| 2,556,947 | Smith | June 12, 1951 |

FOREIGN PATENTS

| Number | Country | Date |
|---|---|---|
| 97,662 | Germany | June 17, 1898 |
| 317,031 | Germany | Dec. 11, 1919 |